United States Patent [19]

Hashimoto et al.

[11] Patent Number: 4,489,396
[45] Date of Patent: Dec. 18, 1984

[54] ELECTRONIC DICTIONARY AND LANGUAGE INTERPRETER WITH FACULTIES OF PRONOUNCING OF AN INPUT WORD OR WORDS REPEATEDLY

[75] Inventors: Shintaro Hashimoto, Ikoma; Akira Tanimoto, Kashihara, both of Japan

[73] Assignee: Sharp Kabushiki Kaisha, Osaka, Japan

[21] Appl. No.: 507,951

[22] Filed: Jun. 24, 1983

Related U.S. Application Data

[63] Continuation of Ser. No. 95,081, Nov. 16, 1979.

[30] Foreign Application Priority Data

Nov. 20, 1978 [JP] Japan ............................ 53-160223[U]

[51] Int. Cl.³ .............................................. G06F 3/16
[52] U.S. Cl. ................................................ 364/900
[58] Field of Search ... 364/200 MS File, 900 MS File

[56] References Cited

U.S. PATENT DOCUMENTS 4,189,779 2/1980 Brautingham ................. 179/1 SM

FOREIGN PATENT DOCUMENTS 1448211 9/1976 United Kingdom .

Primary Examiner—Gareth D. Shaw
Assistant Examiner—John G. Mills
Attorney, Agent, or Firm—Birch, Stewart, Kolasch & Birch

[57] ABSTRACT

A portable word information storage device comprises an input device for entering a specific word or words in a first language, a translator for producing a translated word or words equivalent to the specific word or words, and a voice synthesizer for developing pronunciation of the specific word or words in the first language. The pronunciation of the specific word or words can be repeated in response to an actuation of a repeat key switch. The pronunciation is generated in the same form as one reads it and, otherwise, of spelling or alphabetizing it.

1 Claim, 3 Drawing Figures

ELECTRONIC DICTIONARY AND LANGUAGE INTERPRETER WITH FACULTIES OF PRONOUNCING OF AN INPUT WORD OR WORDS REPEATEDLY

This application is a continuation of application Ser. No. 095,081 filed on Nov. 16, 1979.

BACKGROUND OF THE INVENTION

The present invention relates to a portable word information storage apparatus and, more particularly, to an electronic dictionary and language interpreter with faculties of providing and repeating pronunciation of an input word or words.

Recently, improved portable electronic dictionary and language interpreters have been put on the market. U.S. patents relevant to the above types of the dictionaries were issued, for example, U.S. Pat. No. 4,158,236 grated to Levy, issued June 12, 1979, entitled "ELECTRONIC DICTIONARY AND LANGUAGE INTERPRETER" and U.S. Pat. No. 4,159,536 to Kehoe et al., issued June 26, 1979, entitled "PORTABLE ELECTRONIC LANGUAGE TRANSLATION DEVICE".

For those portable devices, it is further desirable that an input word or words be pronounced repeatedly in order to assure that the input word or words have correctly been entered.

SUMMARY OF THE INVENTION

Accordingly, it is an object of the invention to provide an improved portable word information storage apparatus comprising means for providing and repeating pronunciation of an input word or words.

It is a further object of the invention to provide an improved portable electronic dictionary and language interpreter comprising means for providing and repeating pronunciation of an input word or words in the form of its spelling.

Other objects and further scope of applicability of the present invention will become apparent from the detailed description given hereinafter. It should be understood, however, that the detailed description and specific examples, while indicating preferred embodiments of the invention, are given by way of illustration only, since varrious changes and modifications within the spirit and scope of the invention will become apparent to those skilled in the art from the detailed description.

To achieve the above objects, pursuant to an embodiment of the present invention, a word information storage device comprises an input device for entering a specific word or words in a first language, a translator for developing a translated word equivalent to the specific word or words, and a voice synthesizer for developing pronunciation of the specific word or words in the first language. The pronunciation of the specific word or words can be repeated in response to the actuation of a repeat key switch. The pronunciation is reproduced in the form of reading the specific word or words and, otherwise, of spelling or alphabetizing the same.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE INVENTION

First of all, any kind of language can be applied to an electronic dictionary and language interpreter of the present invention. An input word or words are spelled in a specific language to obtain an equivalent word or words, or a translated word spelled in a different language corresponding thereto. The kind of the languages can be freely selected. According to an example of the present invention, it is assumed that the specific language is English and the different language is Japanese.

Figure 1:
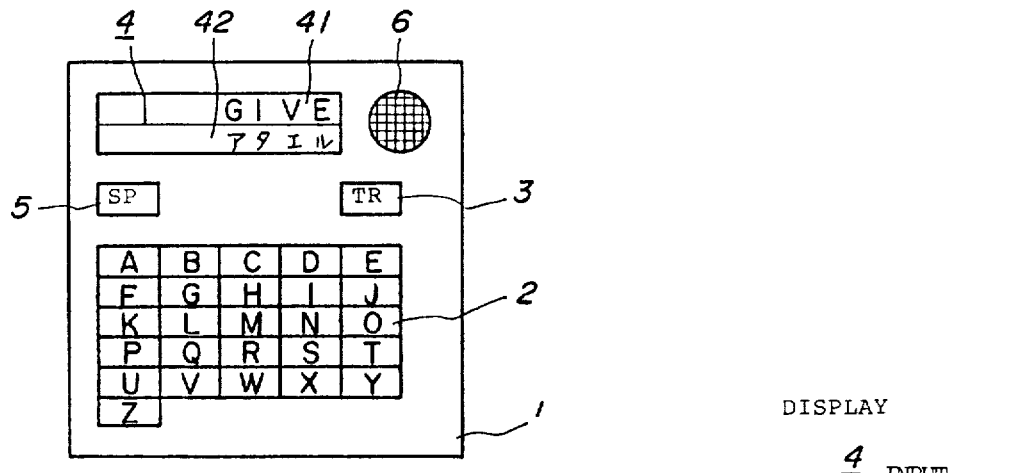
FIG. 1 is a plan view of an electronic dictionary and language interpreter according to the present invention.

Referring to FIG. 1, there is illustrated an electronic dictionary and language interpreter of the present invention. The electronic dictionary and language interpreter comprises a body 1, an alphabetical keyboard 2, a translation key 3, a display 4, a speech key 5, and a speaker 6.

The alphabetical keyboard 2 contains a series of alphabetical symbol keys some of which are actuated to enter a desired English word or words into the electronic dictionary and language interpreter. A Japanese word equivalent to the entered English word or words is examined and displayed in response to an actuation of the translation key 3. The display 4 further comprises an input word indicating device 41 and a translated word indicating device 42 both of which are positioned closely.

The speech key 5 is actuated to direct that the input word or words are pronounced in the same language as entered. The pronunciation of the input word or words is carried out in the same form as one reads it otherwise of spelling or alphabetizing the same according to examples of the present invention. The speaker 6 acts to provide the pronunciation of the input word or words.

Figure 2:
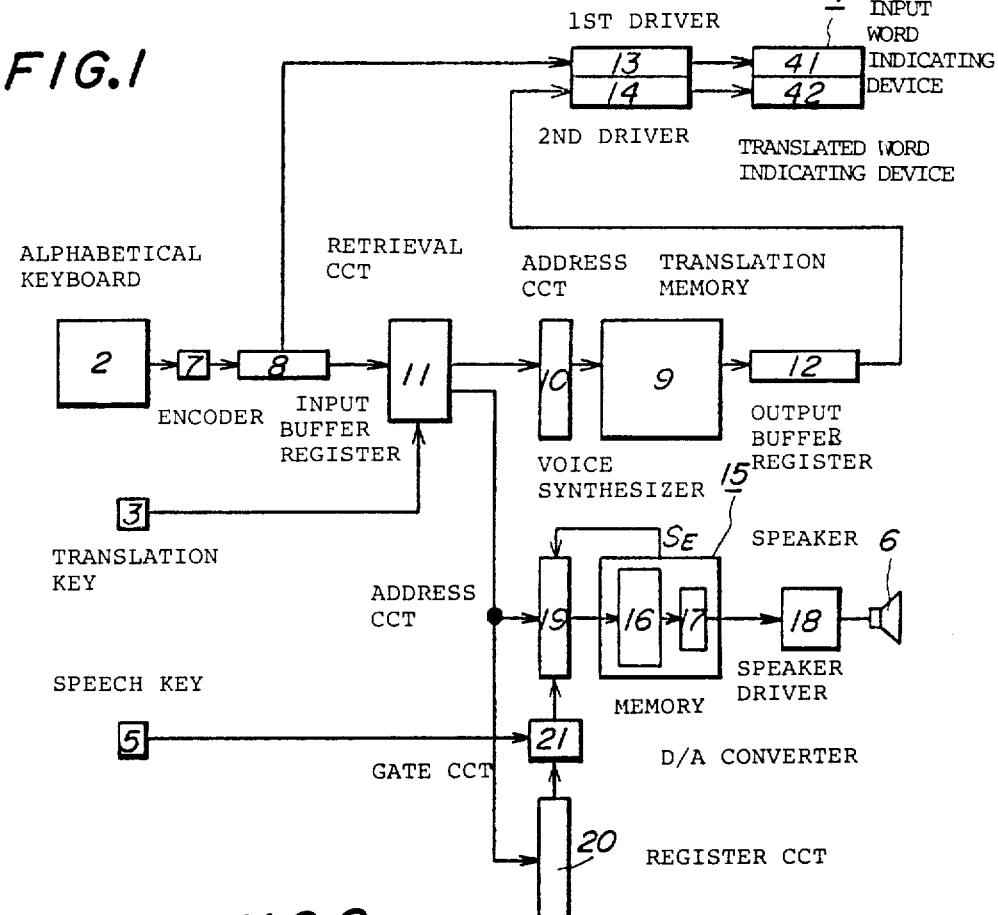
FIG. 2 is a block diagram of a control circuit incorporated into the electronic dictionary and language interpreter shown in FIG. 1.

FIG. 2 shows a block diagram of a control circuit according to an example of the present invention, wherein the pronunciation is provided in the same form as one reads the input word or words. Like elements corresponding to those of FIG. 1 are indicated by like numerals.

There are further provided in the control circuit shown in FIG. 2 an encoder 7, an input buffer register 8, a translation memory 9, an address circuit 10, a retrieval circuit 11, an output buffer 12, and two drivers 13 and 14.

The encoder 7 is operated to provide code information corresponding to the input word or words entered by means of the alphabatical keyboard 2. The input buffer register 8 is provided for storing the code information in the sequence in which the characters designating the input word or words are introduced. The translation memory 9 preliminarily stores a plurality of translated word or words equivalent to the input word or words, the translated word or words being stored in the form of the code information.

The address circuit 10 is operated to address the translation memory 9. Under the circumstances where the input word or words are entered with the help of the alphabetical keyboard 2, in response to an actuation of the translation key 3, the retrieval circuit 11 generates address signals according to output signals from the input buffer register 8. The address signals are applied to the address circuit 10 for the purpose of directing addresses of the translation memory 9 in which the Japanese translated word or words equivalent to the input word or words is stored.

The output buffer register 12 receives the code information generated from the translation memory 9, the code information representing the Japanese translated word or words. The first driver 13 is responsive to the input buffer register 8 so that the first driver 13 drives the input word indicating device 41 so as to indicate the input word or words. The second driver 14 responds to the code information from the output buffer register 12 so that the Japanese translated word or words are indicated in the translation indicating device 42 under the control by the second driver 14.

The control circuit shown in FIG. 2 additionally comprises a voice synthesizer system operable in conjunction with the above-mentioned translation system. The voice synthesizer system comprises the above-stated speech key 5, the speaker 6, a voice synthesizer 15, a memory 16, a D/A converter 17, a speaker driver 18, an address circuit 19, a register circuit 20, and a gate circuit 21.

The voice synthesizer 15 contains the memory 16 and the D/A converter 17. The memory 16 preliminarily stores quantum voice information used for providing the pronunciation equivalent to the input word or words. The D/A converter 17 operates to convert the quantum voice information from the memory 16 to analog information applied to the speaker driver 18. The speaker 6 is controlled by the speaker driver 18 so that the input word or words are pronounced in the same manner as of reading the same.

The memory 16 contains a number of words in the form of the quantum voice information in order to provide a plurality of different kinds of pronunciation according to a plurality of the input words. To provide the plurality of different kinds of the pronunciation due to a plurality of letters of only one English word, the plurality of words defined by the quantum voice information are required to be stored in the memory 16. Each of the plurality of words are placed in such a manner that they are positioned in the first region where the plurality of the words are arranged in a certain sequence on a one-step basis, and the second region where the end code information following the last word is stored for the confirmation of the termination of the words.

The address circuit 19 addresses the memory 16 to specify a certain amount of the words of the quantum voice information. The retrieval circuit 11 develops the address information applied to the address circuit 10 according to the code information stored in the input buffer register 8, in response to the actuation of the translation key 3, as mentioned previously. At the same time, the retrieval circuit 11 generates the address information entered to the address circuit 19 for the purpose of directing the leading step of the memory 16 after which the plurality of the words of the quantum voice information are stored. They are utilized for providing pronunciation of the input word or words. It is constructed that the address circuit 19 keeps counting up at a certain frequency under the condition that the address information is applied to the address circuit 19. Therefore, the words in the form of the quantum voice information continue to develop, while being specified by the detected leading step. The pronunciation of the input word or words is performed in English.

Voice preventing signals SE are generated from the voice synthesizer 15 when the last code information is detected. The address circuit 19 is reset in response to the voice preventing signals SE so that the pronunciation is terminated. When the address circuit 19 is placed in the reset state, the memory 16 is not addressed anymore and the address circuit 19 is prevented from counting up.

In accordance with the above-stated circuit configuration, the pronunciation of the input English word or words is obtained in response to an actuation of the translation key 3. Under the circumstances, the speech key 5 can be actuated to repeat the pronunciation as stated below each time the speech key 5 is actuated.

The register circuit 20 is provided for storing the address signals from the retrieval circuit 11 associated with the leading step of the memory 16, the leading step being specified to direct a series of the words by the quantum voice information stored in the memory 16. The address information developed from the retrieval circuit 11 in response to the actuation of the translation key 3 is entered to both the address circuit 19 and the register circuit 20. The information about the leading step is applied from the register circuit 20 to the gate circuit 21, the information being stored in the register circuit 20. The information stored in the gate circuit 21 is entered to the address circuit 19 in response to the actuation of the speech key 5. The register circuit 20 stores the information about the leading step therein.

In connection with the above-mentioned circuit configuration, the information about the leading step is entered from the register circuit 20 to the address circuit 19 each time the speech key 5 is actuated. Therefore, the pronunciation of the input English word or words is performed at desired times.

A desired English word or words, e.g., "GIVE" is introduced into the control circuit by the actuation of the alphabetical keyboard 2. The input English word or words are indicated in the input word indicating device 41 so that they can be confirmed visibly. The retrieval for the Japanese translated word or words is performed in response to the actuation of the translation key 3. The examined Japanese translated word アタエル in the Japanese language or a word alphabetizing the Japanese word, "a-ta-e-ru", is indicated in the translated word indicating device 42. In synchronization with the display of the input English word or words, the pronunciation of the same is generated from the speaker 6 at once. If it is desired that the pronunciation should be repeated, the speech key 5 should be actuated to repeat the pronunciation a desired number of times.

Figure 3:
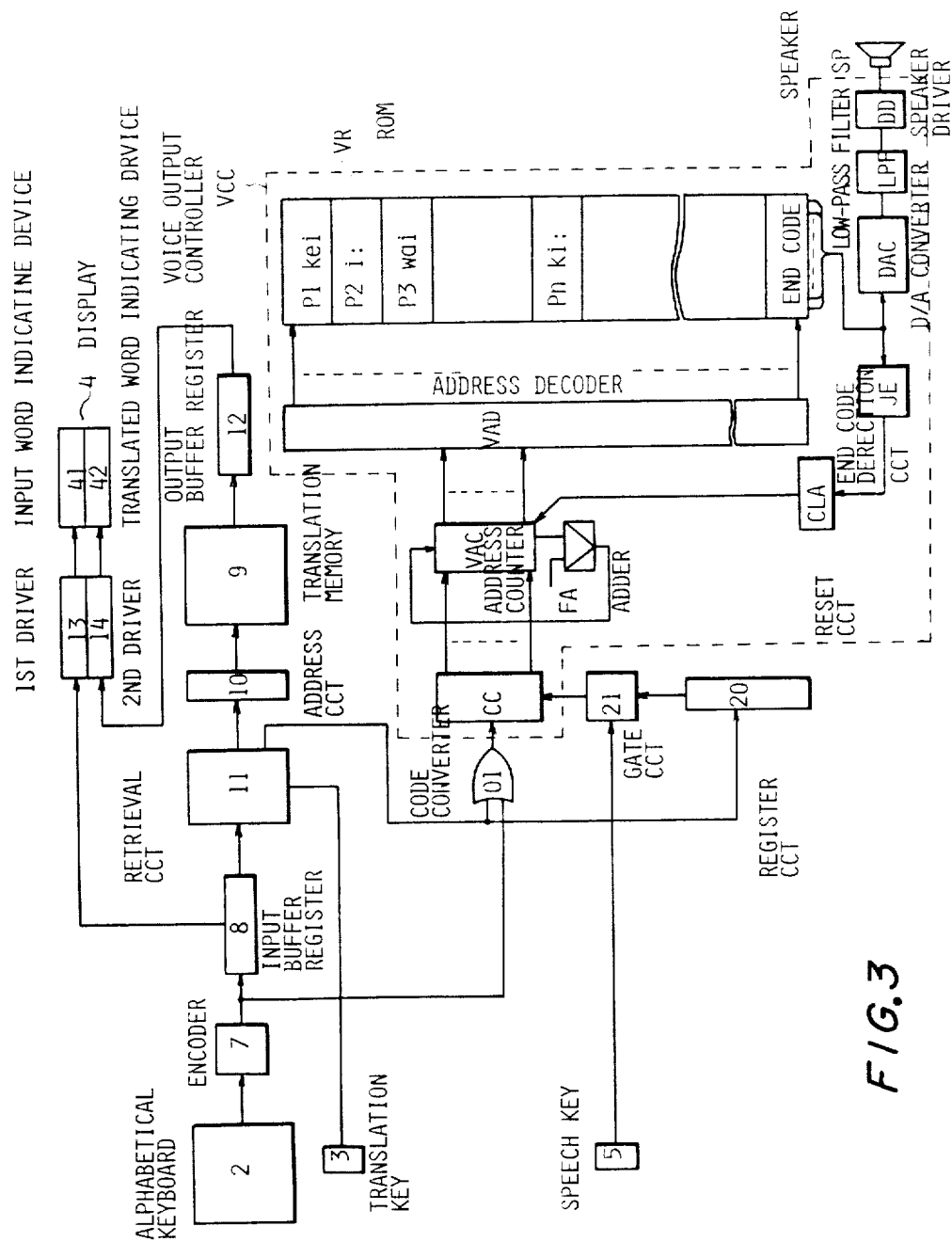
FIG. 3 is a block diagram of another control circuit related to that shown in FIG. 2.

FIG. 3 shows another example of the control circuit according to the present invention, wherein the pronunciation is generated such that the input English word or words are spelled or alphabetized. Like elements corresponding to those of FIG. 2 are indicated by like numerals.

There are additionally provided in the control circuit shown in FIG. 3 as compared to that in FIG. 2 an OR gate O1, the speaker SP, and a voice output controller VCC. The voice output controller VCC is to a certain extent the same as a circuit shown in FIG. 2 comprising the address circuit 19, the voice synthesizer 15, and the speaker driver 18.

The voice output controller VCC further comprises a code converter CC, an address counter VAC, an address decoder VAD, an adder FA, aread only memory (ROM) VR, a reset circuit CLA, an end code detection circuit JE, a D/A converter DAC, a low-pass filter LPF, and a speaker driver DD. The ROM VR contains a plurality of words indicative of the quantum voice information. A plurality of regions P1 to Pn are labeled to indicate respective locations where at least one word is defined in the form of the quantum voice information.

The code converter CC is provided for converting applied code information to the leading address information applied to the address converter VAC. The address converter VAC is provided for addressing the ROM VR. It is placed in a reset state by the reset circuit CLA and the word stored in the ROM VR is prevented from generating. When the address counter VAC is kept in the reset state, the word stored in the ROM VR does not generate since any address of the ROM VR is not addressed. The address decoder VAD addresses the Rom VR in response to the address counter VAC.

When the pronunciation should be desired, the address counter VAC is set to have the leading address of one of the regions P1 to Pn stored in the ROM VR. The leading address specifies the word to be pronounced. If the word to be pronounced is assumed to be stored in the region P2, the leading address of the P2 region is defined by the address counter VAC. Therefore, a plurality of addresses belonging to the P2 region are developed from the ROM VR.

The adder FA is provided for proceeding the addresses of the address counter VAC by a step, i.e., VAC+1→VAC. While the address counter VAC is placed in a reset condition, the adder FA is also placed inoperative so that the contents of the address counter VAC are unchanged with the address counter being kept reset. When the leading address is contained in the address counter and make the same placed in a reset state, the adder FA performs its operation, VAC+1-→VAC at a certain sampling frequency. After the leading address information is entered to the address counter VAC, the address of the address counter VAC is automatically advanced by one step. Therefore, the plurality of words stored in the ROM VR indicative of the quantum voice information are continuously developed as far as they are contained in one region of the ROM VR.

Output signals developed from the ROM VR are introduced into the end code detection circuit JE and the D/A converter DAC. The D/A converter functions to convert the quantum voice information from digital code information to analog information. The analog information is entered into the low-pass filter LPF to pass only low frequency components. The reason of the presence of the low-pass filter LPF is that if the analog information contains high frequency components, noise may be developed from the speaker SP. The output signals from the low-pass filter LPF are applied to the speaker driver DD so that the pronunciation is generated from the speaker SP.

An end code information is stored in the ROM VR, following the plurality of the regions P1 to Pn. The end code information designates that the plurality of the words stored in the form of the quantum voice information are all developed from the ROM VR. The generation of the end code information is detected by means of the end code detection circuit JE. The end code detection circuit permits the reset circuit CLA to reset the address counter VAC. Hence, the ROM VR is prevented from being addressed by the address counter VAC. The pronunciation is therefore terminated. Before the next leading address is admitted to the address counter VAC, the address counter VAC and then the ROM VR are placed in an inoperative state.

The OR gate O1 is connected to apply the output signals from the retrieval circuit 11 and the encoder 7 to the code converter CC.

In the above stated circuit configuration, the pronunciation of the input English word or words is developed as follows in the form of spelling or alphabetizing manner. According to an example of the present invention, the input English word or words is assumed to be "KEY".

The input word is introduced by the actuation of the alphabetical keyboard 2 in the form of alphabetizing or spelling manner. At first, a key of the alphabetical keyboard 2 designating the character "K" is actuated.

The code information representative of the character "K" is applied to the encoder 7 and then the OR gate O1. Through the OR gate O1, the code information is entered into the code converter CC. The code information is also entered from the encoder 7 to the input buffer register 8. The code information entered into the code converter CC is converted to the leading address information which is applied to the address counter VAC. The leading address information specifies the region P1 of the ROM VR. Therefore, the plurality of kinds of the quantum voice information stored in the region P1 are developed as mentioned previously so that the pronunciation equivalent to the character "K" is provided from the speaker SP in the form of spelling the same, "kei".

When the code detection circuit JE finds out that the end code information of the region P1, the address counter VAC is rendered to be reset to prevent the pronunciation from the speaker SP.

When the following character "E" is introduced by means of the alphabetical keyboard 2, the pronunciation of "i:" is similarly developed from the speaker SP. It is assumed that this type of the pronunciation information is stored in the following region P2.

At last when the last character "Y" is entered with the actuation of the alphabetical keyboard 2, the pronunciation of "wai" is developed.

This type of the pronunciation is presumed to be contained in the region P3.

The code information representing the three characters "K", "E", and "Y" is successively stored in the input buffer register 8. The code information is entered into the retrieval circuit 11 so that, in response to the actuation of the translation key 3, the retrieval circuit produces the code information designating "KEY". The code information produced from the retrieval circuit 11 is admitted to the OR gate O1 and then the code converter CC, and simultaneously to the register circuit 20.

With the help of the code information now received by the code converter CC, the leading address corresponding to the pronunciation "KEY" is preset in the address converter VAC. This type of the pronunciation is assumed to be stored in the region Pn of the ROM VR. Therefore, the pronunciation "ki:" equivalent to the characters "KEY" is generated from the speaker SP as mentioned previously.

Under the circumstances, each time the speech key 5 is actuated, the code information stored in the register circuit 20 representative of "ki:" is applied to the code converter CC through the AND gate 21. Accordingly, the pronunciation "ki:" repeats.

The code converter CC for producing information representative of the leading address can be omitted since the encoder 7 and the retrieval circuit 11 alternatively provide the code information representing the leading address, respectively.

The repetition of the pronunciation in the form of spelling or alphabetizing the input English word or words can be obtained under the condition that the register circuit 20 contains a plurality of kinds of the code information each representing only one character such as "K", "E", and "Y".

While only certain embodiments of the present invention have been described, it will be apparent to those skilled in the art that various changes and modifications may be made therein without departing from the spirit and scope of the invention as claimed.

What is claimed is:

1. In an electronic dictionary and language translator device comprising input means for receiving one or more words in a first language input by an operator, data processing means for determining translated or equivalent words corresponding to the words input by an operator, and output means for communicating the translated or equivalent words to the operator, the combination comprising:

entering means for entering a specific input word into said device;

a translation key switch;

translation means connected to said entering means and responsive to actuation of said translation key switch for translating said specific input corresponding word into a different word;

display means for displaying both said corresponding word and said specific input word;

audible sound producing means responsive to actuation of said translation key switch for producing a series of audible sounds representative of the individual letters which comprise the specific input word;

a speech key switch for actuating said device to pronounce said input word as entered by the operator; and means responsive to actuation of said speech key switch for audibly pronouncing the entire specific input word entered by the operator subsequent in time to the production of the series of audible sounds representative of the individual letters which comprise the specific input word.

* * * * *